United States Patent
Field

[11] Patent Number: 5,972,476
[45] Date of Patent: Oct. 26, 1999

[54] LAMINATED PARTS AND METHOD OF MAKING SAME

[75] Inventor: Robert H. Field, Bay City, Mich.

[73] Assignee: Means Industries, Inc., Saginaw, Mich.

[21] Appl. No.: 08/975,620

[22] Filed: Nov. 21, 1997

[51] Int. Cl.⁶ .............. B32B 1/00; B60R 25/02; B23P 11/00
[52] U.S. Cl. .......... 428/174; 428/137; 428/192; 29/437; 29/505; 29/525.14; 70/252; 74/492; 156/196; 156/222
[58] Field of Search .............. 428/172, 57, 174, 428/63, 182, 133, 137; 156/222, 176, 196, 220, 239, 209, 297; 70/252; 74/492; 180/2.26; 219/137 R; 29/437, 505, 525.14, 894.1

[56] References Cited

U.S. PATENT DOCUMENTS

| | | |
|---|---|---|
| 3,086,899 | 4/1963 | Smith et al. ................. 428/178 |
| 4,114,019 | 9/1978 | Sandor . |
| 4,662,974 | 5/1987 | Roberts . |
| 4,771,826 | 9/1988 | Grehier et al. ............. 165/166 |
| 5,349,740 | 9/1994 | Neuenschwander . |
| 5,349,741 | 9/1994 | Neuenschwander . |
| 5,359,763 | 11/1994 | Neuenschwander . |
| 5,373,622 | 12/1994 | Neuenschwander . |
| 5,384,947 | 1/1995 | Kildal et al. . |
| 5,447,772 | 9/1995 | Flieger ........................ 428/99 |
| 5,448,831 | 9/1995 | Harwood . |
| 5,472,772 | 12/1995 | Jones . |
| 5,539,974 | 7/1996 | Isayama . |
| 5,604,678 | 2/1997 | Neuenschwander . |
| 5,604,971 | 2/1997 | Steiner . |

Primary Examiner—Donald Loney
Attorney, Agent, or Firm—Brooks & Kushman P.C.

[57] ABSTRACT

A method of manufacturing a load-transmitting part having at least two lateral engaging surfaces includes stamping a plurality of thin laminas from generally planar stock material. The laminas are stacked together such that the laterally-disposed surfaces of adjacent laminas cooperate to define the lateral engaging surfaces of the part. The laminas are permanently secured together to prevent relative laminar movement when a load is transmitted from one of the lateral engaging surfaces to another of the lateral engaging surfaces.

29 Claims, 3 Drawing Sheets

```
┌─────────────────────────────────────────────┐
│   STAMPING LAMINAS FROM STOCK TO PROVIDE A  │
│ PLURALITY OF LATERALLY-DISPOSED SURFACES THEREON │
└─────────────────────────────────────────────┘
                      │
                      ▼
┌─────────────────────────────────────────────┐
│   STACKING THE LAMINAS TOGETHER TO DEFINE THE│
│  LATEREAL ENGAGING SURFACES WITH THE LATERALLY-│
│              DISPOSED SURFACES              │
└─────────────────────────────────────────────┘
                      │
                      ▼
┌─────────────────────────────────────────────┐
│   SECURING THE LAMINAS TOGETHER TO PREVENT  │
│         RELATIVE LAMINAR MOVEMENT           │
└─────────────────────────────────────────────┘
```

Fig. 6

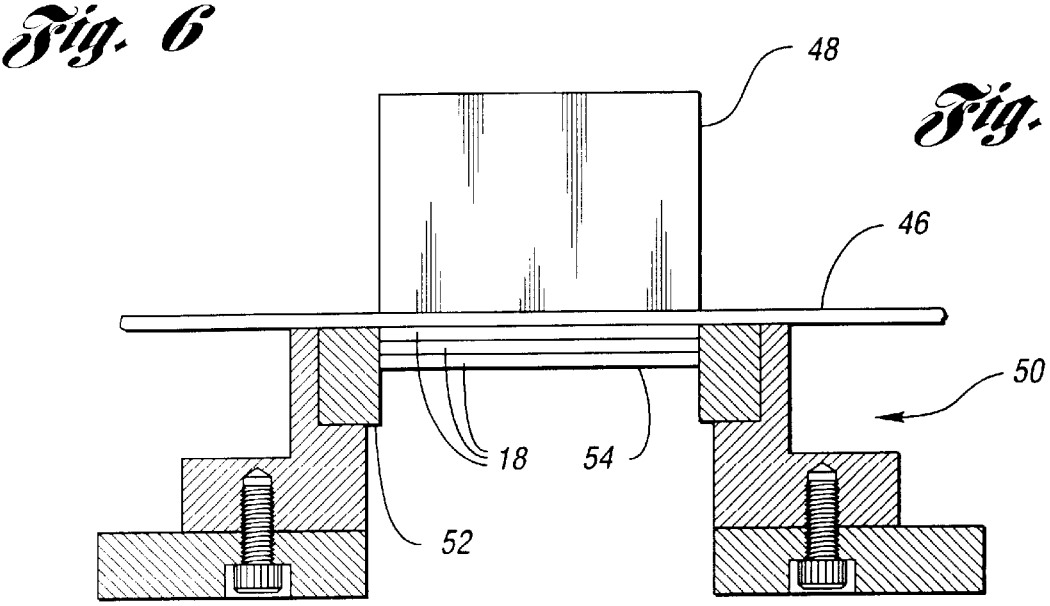

Fig. 7

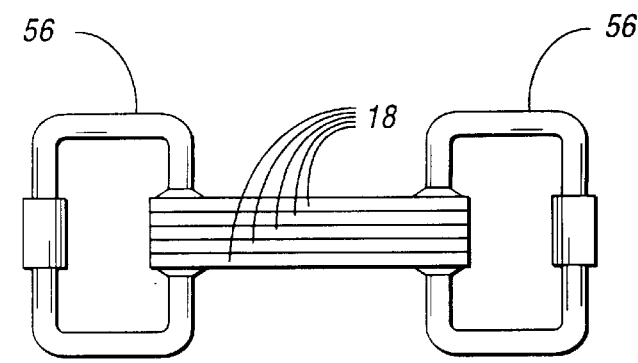

Fig. 8 ic # LAMINATED PARTS AND METHOD OF MAKING SAME

TECHNICAL FIELD

The invention relates to load-transmitting component parts and their manufacture, and more particularly to load-transmitting laminated component parts and their manufacture.

BACKGROUND ART

A conventional method for manufacturing load-transmitting component parts includes stamping a roughly-dimensioned, monolithic blank from continuous strip stock material; heat treating the blank to obtain a desired hardness; broaching or otherwise machining the blank to obtain a desired configuration of the finished part including the part's load bearing or "engaging" surfaces; and then heat treating the part again to reduce the residual stresses resulting from the broaching or machining step. This known method for making monolithic parts, with its multiple steps, is time consuming and costly.

Furthermore, because the stamping and broaching steps are typically performed on a relatively thick piece of material, close tolerances on the configuration of the finished part are costly to obtain. For example, during the stamping step, a punch tool having a configuration of the desired blank is used to punch a blank from continuous strip stock material. The stock material is supported on a die having a hole which likewise has a configuration of the desired blank, but slightly larger than the dimensions of the punch. As the punch forces the stock material through the die, the leading edge of the blank being formed is typically depressed slightly, thereby forming a radius on the leading edge. As the punch forces the stock material further through the die, a portion of the desired blank is sheared from the remaining stock material, thereby forming a substantially smooth shear section. Finally, as the punch forces the stock material completely through the die, the last interconnecting portion between the stock material and the trailing edge of the blank being formed breaks, thus resulting in a die break section which is rough compared to the shear section.

Typically as the thickness of the stock material increases, the radius thus-formed on the leading edge and the size of the die break section likewise increase. Each of these surface defects must typically be removed by broaching or machining, thereby greatly increasing the relative cost of such parts. In response, the prior art teaches the use of an intermediate heat treating step, thereby permitting use of a relatively soft stock material from which to stamp the rough part.

Other known methods of manufacturing load-transmitting component parts involve forging or casting a rough part, and then machining the rough part to obtain the desired configuration of the finished part. While it is possible to achieve close tolerances on the configuration of the finished part, these methods involve significant tooling and equipment costs.

SUMMARY OF THE INVENTION

Accordingly, it is an object of the invention to provide a method by which load-transmitting component parts can be manufactured efficiently and cost effectively to achieve close dimensional tolerances.

Another object of the invention is to provide a method by which load-transmitting component parts can be manufactured without requiring any intervening heat treating or annealing steps.

Still another object of the invention is to provide a laminated, load-transmitting component part, particularly a component part suitable for use in a vehicle.

In accordance with the invention, a component part having at least two lateral load-bearing or "engaging" surfaces comprises a plurality of laminas, each of the laminas having a plurality of laterally-disposed surfaces. The laminas are stacked such that laterally-disposed surfaces of at least two of the laminas cooperate to define each of the part's lateral engaging surfaces. The laminas are secured together to prevent relative movement of any one of the laminas with respect to another of the laminas when a load is transmitted through the part from one of the lateral engaging surfaces to another of the lateral engaging surfaces.

In a preferred embodiment, a plurality of projections and complementary recesses are formed in several of the lamina such that, when stacked, the projections and recesses of adjacent lamina are placed in an interference fit. In this manner, the laminas may be secured together for relatively low transmitted load applications without the use of other securing mechanisms, such as welds or fasteners.

Under the invention, a method for manufacturing a load-transmitting component part having at least two lateral engaging surfaces includes stacking a plurality of laminas together such that laterally-disposed surfaces defined on at least two of the laminas cooperate to define each lateral engaging surface of the part. The method further includes securing the laminas together to prevent relative movement of any one of the laminas with respect to another of the laminas when a load is transmitted through the part from one of the part's lateral engaging surfaces to another of its lateral engaging surfaces.

The foregoing and other objects, features and advantages of the present invention will be more readily apparent to those skilled in the art after review of the best mode for carrying out the invention, taken in conjunction with the accompanying drawings.

BRIEF DESCRIPTION OF THE DRAWINGS

FIG. 6 is a flow chart of an exemplary method according to the invention;

FIG. 7 is a cross sectional view of a fixture holding a stack of laminas; and

FIG. 8 is a side view of a stack of laminas held together by clamps.

BEST MODE FOR CARRYING OUT THE INVENTION

Figure 1:
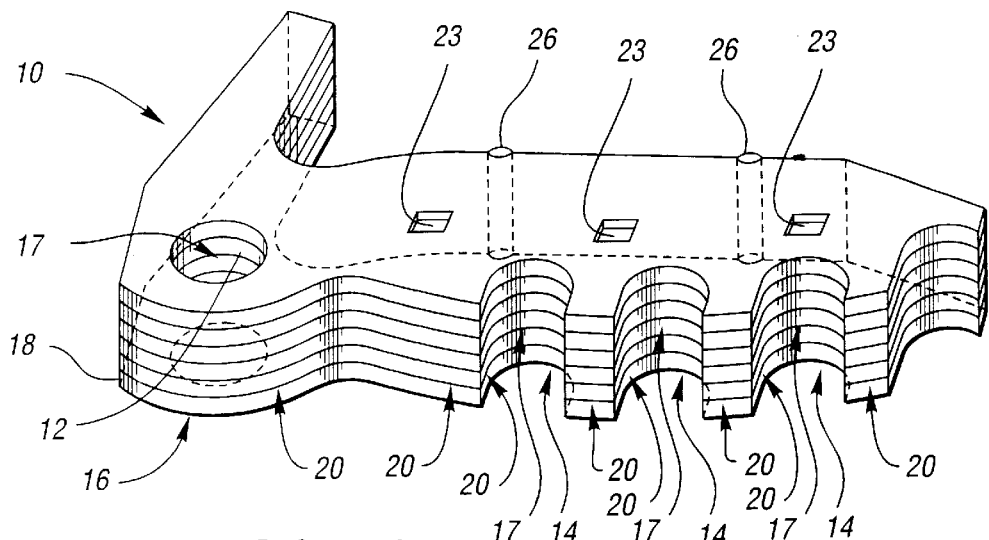
FIG. 1 is a perspective view of a first exemplary laminated part manufactured in accordance with the invention.
Figure 2:
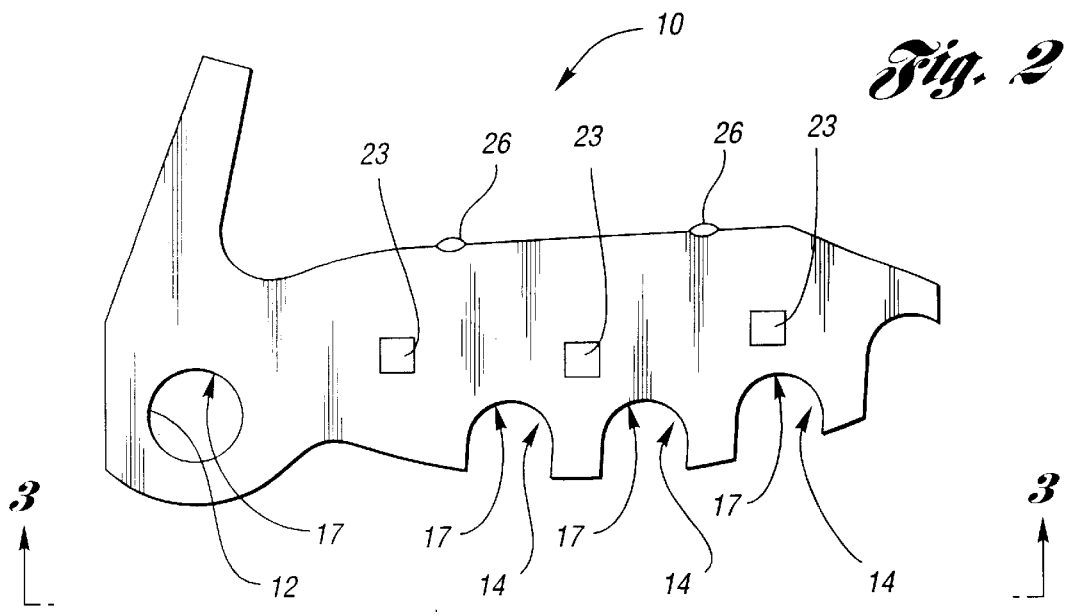
FIG. 2 is a top view of the first exemplary laminated part shown in FIG. 1.
Figure 3:
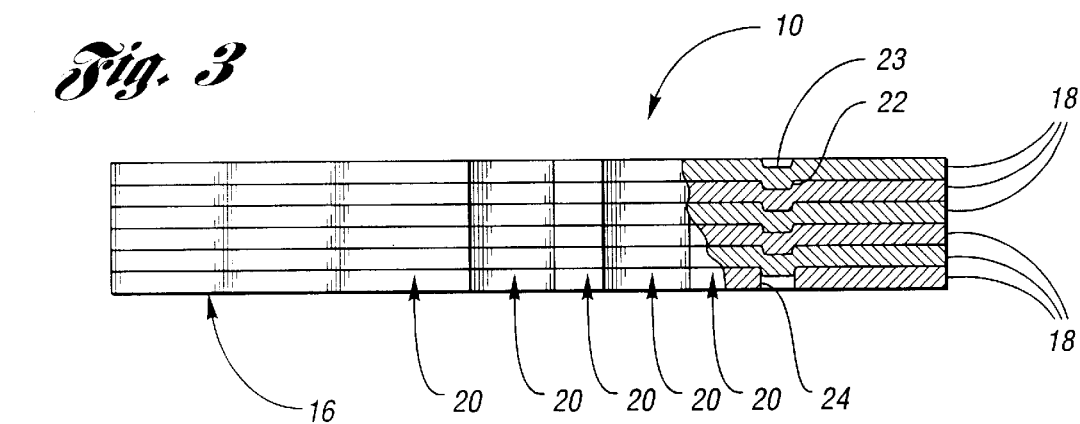
FIG. 3 is a side view of the first exemplary laminated part shown in FIG. 1.

FIGS. 1 through 3 show a first exemplary laminated component part, which is a steering wheel lock shoe 10. The lock shoe 10 has one aperture 12 and three notches 14, and a lower end surface 16. The aperture 12 and the three notches 14 each define a lateral engaging surface 17 one the part 10, i.e., a surface against which an external load will bear when a load is transmitted through the part 10. By way of example only, the lock shoe 10 may be used in a vehicle to lock a tilt steering wheel in three different operating positions corresponding to the three notches 14. The number of lateral engaging surfaces 17 may vary depending on the design requirements of a particular part.

As seen in FIGS. 2 and 3, the lock shoe 10 has a plurality of stacked laminas 18. Each of the laminas 18 has a plurality of laterally-disposed surfaces 20 and a plurality of downward interlocking projections 22 and opposed complimentary recesses 23, with the exception that the lamina 18 forming the lower end surface 16 of the part 10 is provided with a plurality of openings 24 in lieu of any interlocking projections 22. For the purpose of clarity, the laterally-disposed surfaces 20 are labeled on only one of the laminas 18 in FIGS. 1 and 3. With respect to the first exemplary steering wheel lock shoe 10, each lamina 18 preferably has roughly the same general size and shape, which is determined by the size and shape of the laterally-disposed surfaces 20. The size and shape of one or more of the laminas 18 may vary from the size and shape of another lamina 18, however, depending on the design requirements of a particular part.

Preferably, the laterally-disposed surfaces 20 of adjacent laminas 18 cooperate to define the four lateral engaging surfaces 17 of the part 10. However, it will be appreciated that another laminated component part (not shown) according to the invention need only have laterally-disposed surfaces of at least two laminas cooperate to define each of the part's lateral engaging surfaces. Furthermore, the laterally-disposed surfaces that cooperate to define one of the lateral engaging surfaces may be disposed on the same or different laminas as compared with the laterally-disposed surfaces that define another of the part's lateral engaging surfaces.

The recesses 23 of each lamina 18 and the openings 24 of the lamina 18 forming the lower end surface 16 of the part 10 are sized and shaped to be engageable with the corresponding projections 22 of an immediately adjacent lamina 18, as shown in FIG. 3. Thus the projections 22 cooperate with the recesses 23 and openings 24 to lock the laminas 18 together to prevent relative movement of any one of the laminas 18 with respect to another of the laminas 18 when a load is transmitted from one of the lateral engaging surfaces 17, defined by the notches 14, to the lateral engaging surface 17 defined by the aperture 12. While the invention contemplates providing projections 22, recesses 23 and openings 24 of any suitable shape, the projections 22, recesses 23 and openings 24 are preferably generally rectangular. The laminas 18 of the first exemplary steering wheel lock shoe 10 are also preferably laser welded together, whereby at least two weld beads 26 are formed, to further prevent relative laminar movement.

Figure 4:
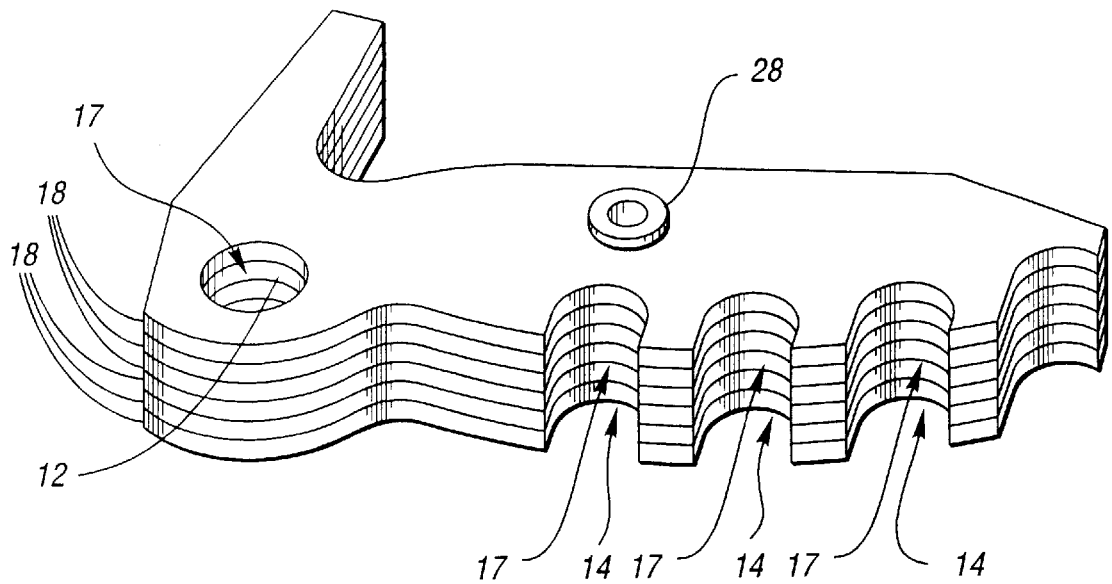
FIG. 4 is a perspective view of a second exemplary laminated part manufactured in accordance wit the invention.

FIG. 4 shows a second exemplary laminated steering wheel lock shoe 110 according to the present invention. The lock shoe 110 is the same as the lock shoe 10 except the laminas 18 are not welded together and the laminas 18 are provided without any interlocking projections 22, recesses 23 or openings 24. The laminas 18 of lock shoe 110 are secured together by a conventional rivet 28 to prevent relative movement of any one of the laminas 18 with respect to another of the laminas when a load is transmitted from one of the lateral engaging surfaces 17 to another of the lateral engaging surface 17. Alternatively, the laminas 18 may be secured together in any other suitable manner.

Figure 5:
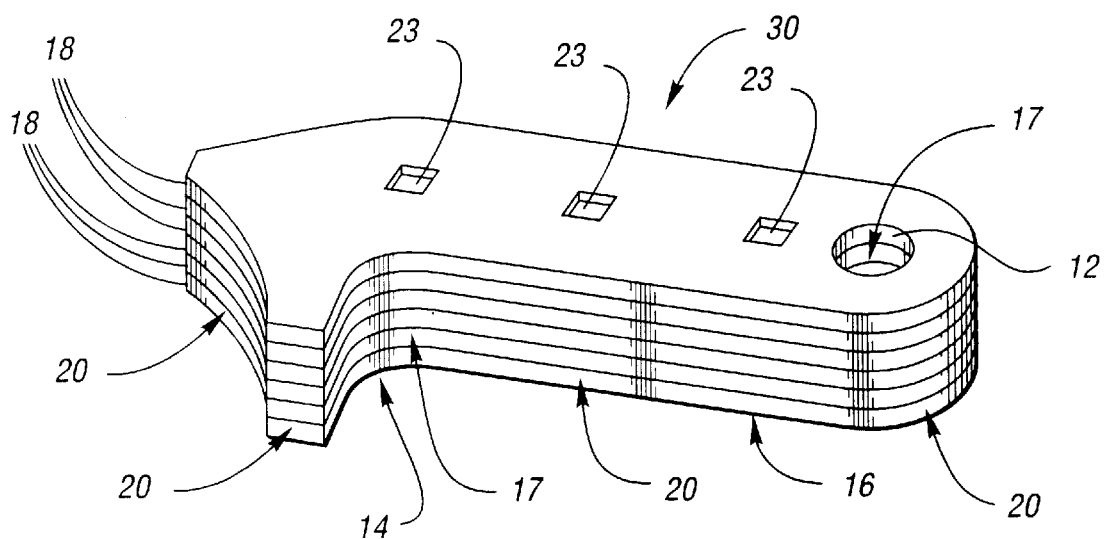
FIG. 5 is a perspective view of a third exemplary laminated part manufactured in accordance with the invention.

FIG. 5 shows a third exemplary laminated component part according to the present invention. This laminated part is a parking pawl 30, which may be used in conjunction with an automatic transmission of a vehicle to lock the transmission in a stationary position. Similar elements common to both the parking pawl 30 and the steering wheel lock shoe 10, as shown in FIGS. 1 through 3, have been given the same reference numerals. The parking pawl 30 has an aperture 12, a notch 14 and a lower end surface 16. The aperture 12 and the notch 14 each define a lateral engaging surface 17 on the part 30.

As seen in FIG. 5, the parking pawl 30 has a plurality of stacked laminas 18. Each of the laminas 18 has a plurality of laterally-disposed surfaces 20 and a plurality of downward projections 22 (not shown in FIG. 5) and opposed complimentary recesses 23, with the exception that the lamina forming the lower end surface 16 of the part 30 is provided with a plurality of openings 24 (not shown in FIG. 5) in lieu of any interlock projections. For the purpose of clarity, the laterally-disposed surfaces 20 are labeled on only one of the laminas 18 in FIG. 5. As with the steering wheel lock shoe 10 of FIGS. 1 through 3, the recesses 23 of each lamina 18 and the openings 24 of the lamina 18 forming the lower end surface 16 of the part 30 are engageable with the corresponding projections 22 of the immediately adjacent lamina 18. No additional means of securing the laminas 18 together, however, is utilized for the parking pawl 30.

FIG. 6 is a flow chart illustrating an exemplary method according to the invention for manufacturing a load-transmitting part, such as the first exemplary steering wheel lock shoe 10 illustrated in FIGS. 1 through 3. While the method contemplates any suitable manner of providing a plurality of thin laminas 18, in a preferred method, the laminas 18 are stamped from thin strip stock material. By way of example only, the laminas 18 are preferably stamped using a conventional punch and die from a strip of pre-hardened generally planar steel strip stock 46 having a hardness value preferably in the range of 65 to 100 $R_b$.

As shown in FIGS. 1 through 3, the stamping step forms a plurality of laterally-disposed surfaces 20 and a plurality of downward projections 22, recesses 23 and openings 24 on the laminas 18. For the purpose of clarity, the laterally-disposed surfaces 20 are labeled on only one of the laminas 18 in FIGS. 1 and 3. Alternatively, the laminas 18 may be formed by cutting or otherwise forming the laminas from suitable stock material.

After each lamina 18 is stamped from the strip stock 46, the lamina is preferably transferred as by a punch 48 into a suitable fixture, such as a stacking device 50 as shown schematically in FIG. 7. The stacking device 50 includes a choke element 52 which is sized and shaped to receive and hold a stack 54 of laminas 18. As each lamina 18 is pushed into the stacking device 50, the projections 22 of the pushed lamina 18 engage the corresponding recesses 23 of the lamina 18 at the top of the stack 54, thereby locking the laminas together to prevent relative laminar movement. As each lamina 18 is forcefully inserted onto stack 54, the other laminas 18 are pushed downwardly a distance roughly equal to the thickness of the lamina 18. In this regard, it is noted that the stamping and stacking steps of the exemplary method shown in FIG. 6 may be performed by an apparatus similar to the apparatus disclosed in U.S. Pat. No. 5,349,740 to L. H. Carbide, which disclosure is hereby incorporated by reference.

The laminas 18 are continually stacked in the stacking device 50 until the height of the stack 54 is roughly equal to the desired thickness of the steering wheel lock shoe 10. By way of example, where the stock material is nominally 0.037 inches thick, a steering wheel lock shoe 10 having a nominal thickness of 0.370 inches will typically include ten laminas 18. The number of laminas required for a particular part may vary depending on the desired thickness and load-transmitting capability of the part 10.

Alternatively, the laminas 18 may be stamped or otherwise formed such that no projections 22, recesses 23 or openings 24 are formed in the laminas 18 as shown in FIG. 4. For example, it may be desirable to eliminate the interlock tabs 22 from the laminas 18 if the stock material 46 is too brittle, due to a required hardness value of the stock material 46 for a particular part, to allow formation of the tabs. The laminas 18 may then be stacked and manually or otherwise held together, such as with clamps 56 as shown in FIG. 8, to substantially eliminate any gaps between the laminas 18.

During the stacking step, the laterally-disposed surfaces 20 of at least two of the laminas 18 are positioned such that the laterally-disposed surfaces 20 of at least two laminas 18 cooperate to define each of at least two lateral engaging surfaces 17 of the finished steering wheel lock shoe 10. As noted above, the number of lateral engaging surfaces 17 may vary depending on the design requirements of a particular part. Preferably, the laterally-disposed surfaces 20 of adjacent laminas 18 cooperate to define continuous lateral engaging surfaces 17 on the steering wheel lock shoe as seen in FIG. 1.

Next, the laminas 18 are secured together to prevent relative movement of any one of the laminas 18 with respect to another of the laminas 18 when a load is transmitted through the part 10 from one of the lateral engaging surfaces 17 to another of the lateral engaging surfaces 17. As noted above, the laminas 18 may be secured together by weld beads 26 as shown in FIGS. 1 through 3, by a conventional rivet 28 as shown in FIG. 4, or in any other manner known to those skilled in the art. Weld beads may be formed by conventional arc welding, laser welding, or any other welding process as understood by those skilled in the art. Alternatively, interlocking the laminas 18 together by engaging the projections 22, recesses 23 and openings 24 of adjacent laminas 18 may be sufficient in relatively low load-transmitting applications to prevent relative laminar movement without any additional securing step.

In the preferred method of practicing the invention, the strip stock is provided with the desired hardness of the finished part, and no intervening heat treatment steps are required. Alternatively, the laminas may be heat treated following the stamping step to obtain a desired hardness.

The invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the invention may be practiced otherwise than as specifically described.

What is claimed is:

1. A part for transmitting a load between multiple components and having at least two lateral engaging surfaces, each of the lateral engaging surfaces being adapted to engage a respective one of the components, the part comprising a plurality of stacked laminas, each of the laminas being rigid and generally planar and having a plurality of laterally-disposed surfaces, wherein the laterally-disposed surfaces of at least two of the laminas cooperate to define each of the lateral engaging surfaces, and wherein the laminas are secured together to prevent relative movement of any one of the laminas with respect to another of the laminas when the load is transmitted through the part from one of the lateral engaging surfaces to another of the lateral engaging surfaces.

2. The part of claim 1, wherein the part has at least three lateral engaging surfaces, and wherein the load is selectively transmitted between at least two of the lateral engaging surfaces.

3. The part of claim 1, wherein a first lamina has a projection and a second lamina has a recess, and wherein the projection of the first lamina interferingly engages the recess of the second lamina.

4. The part of claim 1, wherein one lamina is welded to another lamina.

5. The part of claim 1, further including a fastener for securing one lamina to another lamina.

6. The part of claim 1, wherein the laterally-disposed surfaces of one lamina define a different shape than the laterally-disposed surfaces of another lamina.

7. The part of claim 1, wherein adjacent laterally-disposed surfaces of the laminas cooperate to define at least one continuous lateral engaging surface of the part.

8. The part of claim 1, wherein at least two laminas include an aperture formed therein, the apertures defining additional laterally-disposed surfaces of the at least two laminas, the additional laterally-disposed surfaces cooperating to define at least one of the lateral engaging surfaces.

9. A method of manufacturing a part for transmitting a load between multiple components, wherein the part has at least two lateral engaging surfaces, and each of the lateral engaging surfaces is adapted to engage a respective one of the components, the method comprising;

providing a plurality of rigid, generally planar laminas, wherein each of the laminas has a plurality of laterally-disposed surfaces;

stacking the laminas together such that the laterally-disposed surfaces of at least two of the laminas cooperate to define each of the at least two lateral engaging surfaces of the part; and securing the laminas together to prevent relative movement of any one of the laminas with respect to another of the laminas when a load is transmitted through the part from one of the lateral engaging surfaces to another of the lateral engaging surfaces.

10. The method of claim 9, wherein a first lamina has a projection and a second lamina has a recess, and wherein stacking includes inserting the projection of the first lamina into the recess of the second lamina.

11. The method of claim 9, wherein the laterally-disposed surfaces of one lamina define a different shape than the laterally-disposed surfaces of another lamina.

12. The method of claim 9, wherein adjacent laterally-disposed surfaces of the laminas cooperate to define at least one continuous lateral engaging surface of the part.

13. The method of claim 9, wherein stacking includes inserting the laminas into a fixture.

14. The method of claim 9, wherein securing includes welding one lamina to another lamina.

15. The method of claim 9, wherein securing includes fastening one lamina to another lamina.

16. The method of claim 9, wherein the part has at least three lateral engaging surfaces by which to selectively transmit a load between one lateral engaging surface and another of the lateral engaging surfaces.

17. A method of manufacturing a load-transmitting part having at least two notches and one aperture that respectively define lateral engaging surfaces of the part, the method comprising:

stamping a plurality of rigid, generally planar laminas from generally planar stock material, whereby a plurality of laterally-disposed surfaces are formed on each of the laminas, a projection is formed on a first lamina and a recess is formed on a second lamina;

stacking the laminas together such that the laterally-disposed surfaces of the laminas cooperate to define the lateral engaging surfaces of the part, and the projection of the first lamina engages the recess of the second lamina to prevent relative movement of any one of the laminas with respect to another of the laminas when a load is transmitted through the part from one of the lateral engaging surfaces to another of the lateral engaging surfaces; and securing the laminas together to further prevent relative laminar movement.

18. The part of claim 1, wherein the laterally-disposed surfaces cooperating to define a first one of the lateral engaging surfaces are disposed on a first set of laminas, and the laterally-disposed surfaces cooperating to define a second one of the lateral engaging surfaces are disposed on a second set of laminas, the first set not being coextensive with the second set.

19. The part of claim 1, wherein one of the lateral engaging surfaces defines a notch.

20. A steering wheel lock shoe, for use with a motor vehicle, comprising a plurality of stacked laminas, wherein each lamina is rigid and generally planar; each lamina includes a plurality of laterally-disposed surfaces, the laterally-disposed surfaces of at least two of the laminas cooperate to define each of a plurality of lateral engaging surfaces including at least one notch; and wherein the laminas are secured together to prevent relative movement of any one of the laminas with respect to another of the laminas when a load is transmitted through the shoe from one of the lateral engaging surfaces to another of the lateral engaging surfaces.

21. The steering wheel lock shoe of claim 20, wherein at least two of the lateral engaging surfaces are disposed along one side of the shoe.

22. The steering wheel lock shoe of claim 20, wherein the shoe has at least three lateral engaging surfaces, and wherein the load is selectively transmitted between at least two of the lateral engaging surfaces.

23. The steering wheel lock shoe of claim 20, wherein a first lamina has a projection and a second lamina has a recess, and wherein the projection of the first lamina interferingly engages the recess of the second lamina.

24. The steering wheel lock shoe of claim 20, wherein one lamina is welded to another lamina.

25. The steering wheel lock shoe of claim 20, further including a fastener for securing one lamina to another lamina.

26. The steering wheel lock shoe of claim 20, wherein the laterally-disposed surfaces of one lamina define a different shape than the laterally-disposed surfaces of another lamina.

27. The steering wheel lock shoe of claim 20, wherein adjacent laterally-disposed surfaces of the laminas cooperate to define at least one continuous lateral engaging surface of the shoe.

28. The steering wheel lock shoe of claim 20, wherein at least two laminas include an aperture formed therein, the apertures defining additional laterally-disposed surfaces of the at least two laminas, the additional laterally-disposed surfaces cooperating to define at least one of the lateral engaging surfaces.

29. The steering wheel lock shoe of claim 20, wherein the laterally-disposed surfaces cooperating to define a first one of the lateral engaging surfaces are disposed on a first set of laminas, and the laterally-disposed surfaces cooperating to define a second one of the lateral engaging surfaces are disposed on a second set of laminas, the first set not being coextensive with the second set.

* * * * *